UNITED STATES PATENT OFFICE 2,228,233

PROCESS FOR THE MANUFACTURE OF VAT DYESTUFFS OF THE NAPHTHOPHENAZINE SERIES

Hans Hoyer and Otto Bayer, Leverkusen-I. G. Werk, Germany, assignors to General Aniline & Film Corporation, a corporation of Delaware No Drawing. Application March 15, 1938, Serial No. 196,007. In Germany March 20, 1937

4 Claims. (Cl. 260—266)

The present invention relates to new valuable vat dyestuffs.

We have found that new valuable vat dyestuffs are obtained by causing 8-hydroxy-1.2-naphthophenazine-carboxylic acid halides to react with primary or secondary amines containing a radical of a compound which is capable of being vatted.

As amines of the character described which are useful for the production of our new dyestuffs there come into consideration amines, for instance, of the anthraquinone-acridone, phthaloylcarbazole, pyridino-anthrone, or pyrimidino anthrone series and similar ones.

In particular there are employed amines of the anthraquinone itself, such as 1-amino-anthraquinone, 1-amino-4-benzoylamino- or 5-benzoylamino-anthraquinone, 1.4-diamino-anthraquinone, and 1.5-diamino-anthraquinone.

In case an amine is employed bearing more than one amino-group each one of them reacts with an 8-hydroxy-naphthophenazine-carboxylic acid halide. It is to be understood that also those compounds fall within the scope of our present invention.

The 8-hydroxy-1.2-naphthophenazine-carboxylic acid halides used as starting material probably correspond to the following Formula 1:

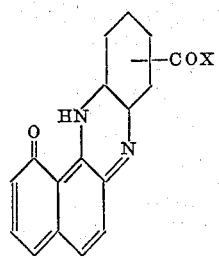

(1)

It is understood that the products may also have the following tautomeric structure according to Formula 2:

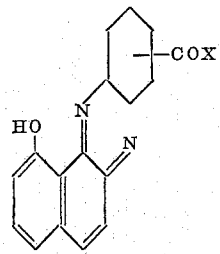

(2)

(X being a halogen in each formula.)

As these products are insoluble in alkali we are inclined to say that they correspond to Formula 1 rather than to Formula 2. Therefore Formula 1 has been chosen for defining our products in the following claims.

The 8-hydroxy-1.2-naphthophenazine-carboxylic acid halides employed as starting material can be obtained in different ways, for instance by causing β-naphtho-quinone-8-sulfuric acid of the formula

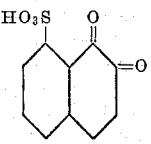

to react with a phenylene-diamine carboxylic acid and melting the 8-sulfuric acid-1.2-naphthophenazine-carboxylic acid thus obtained with an alkali whereby the sulfuric acid group is replaced by the hydroxyl group.

By using for this condensation 1.2-phenylenediamino-3-carboxylic acid a mixture of the isomeric 8-hydroxy-1.2-naphthophenazine-3'- and 6'-carboxylic acids is obtained while the 1.2-phenylene-diamino-4-carboxylic acid yields a mixture of the isomeric 8-hydroxy-1.2-naphthophenazine-4'- and 5'-carboxylic acids. For further transformation the mixture of the isomers can be employed as such. The 8-hydroxy-1.2-naphthophenazine-carboxylic acids dissolve in concentrated sulfuric acid with a blue color. The corresponding acid halides are obtained in the usual way.

The 8-hydroxy-1.2-naphthophenazine-carboxylic acid halides as well as the amines employed may contain further substituents which do not induce solubility in water such as halogen atoms, or benzoylamino groups. Dyesuffs with especially good properties are obtained by using as starting material 8-hydroxy-1.2-naphthophenazine-carboxylic acid halides which contain halogen atoms.

The reaction of the 8-hydroxy-1.2-naphthophenazine-carboxylic acid halides with the amines is carried out at an elevated temperature in the presence of an indifferent solvent such as monochloro-benzene, o-dichloro-benzene, trichloro-benzene, nitrobenzene. In certain cases the presence of an acid-binding agent, such as an alkali metal acetate, may be advantageous.

Our new dyestuffs generally exert good fastness properties. They are especially valuable as they do not damage the fiber.

The following examples illustrate the invention, without, however, restricting it thereto, the parts being by weight:

Example 1

30.9 parts of the mixture of the 8-hydroxy-1.2-naphthophenazine-4'-carboxylic acid chloride and the isomeric 5'-carboxylic acid chloride (see above) are heated at about 150° C. with 22.3 parts of 1-amino-anthraquinone in 200 parts of trichlorobenzene until the formation of dyestuff is complete. After cooling, the precipitated dyestuff is filtered with suction, washed with alcohol and dried. The dyestuff yields after oxidizing from the hydrosulfite vat yellowish orange shades which are rendered clearer by an after-treatment with chlorine.

Example 2

30.9 parts of the mixture of the 8-hydroxy-1.2-naphthophenazine-4'-carboxylic acid chloride and the isomeric 5'-carboxylic acid chloride are heated with 34 parts of 1-amino-5-benzoylamino-anthraquinone in 200 parts of trichlorobenzene until the conversion is complete. After cooling, the dyestuff is filtered with suction, washed with alcohol and dried. The reaction product dyes cotton from the vat fast orange shades.

Example 3

46.7 parts of a mixture of dibromo-8-hydroxy-1.2-naphthophenazine-4'-carboxylic acid chloride and the isomeric 5'-carboxylic acid chloride are heated with 34 parts of 1-amino-4-benzoylamino-anthraquinone in 200 parts of trichlorobenzene until the formation of the dyestuff is complete. After cooling it is filtered with suction, washed with alcohol and dried. The dyestuff yields orange shades.

The mixture of the acid chlorides containing bromine used as starting material is prepared in the following manner:

29 parts of the mixture of 8-hydroxy-1.2-naphthophenazine-4'-carboxylic acid and the isomeric 5'-carboxylic acid are suspended in 300 parts of pyridine; a solution of 40 parts of bromine dissolved in 150 parts of pyridine is added thereto at room temperature. After 12 hours standing the solution is poured into water and the pyridine distilled off. Thereupon the mixture is made acid to Congo red, filtered with suction, washed until neutral, dried and recrystallized from nitrobenzene. The reaction product thus obtained forms brown prisms which dissolve in sulfuric acid with a greenish blue coloration. The product contains 2 atoms of bromine.

Example 4

46.7 parts of the mixture of the dibromo-8-hydroxy-1.2-naphthophenazine-4'-carboxylic acid chloride (see Example 3) and the isomeric 5'-carboxylic acid chloride are heated to about 150° C. with 34 parts of 1-amino-5-benzoylamino-anthraquinone in 200 parts of trichlorobenzene until the reaction is complete. After cooling the dyestuff is filtered with suction, washed with alcohol and dried. The dyestuff thus obtained dyes from the vat fast gold-colored shades.

Example 5

30.9 parts of the mixture of the 8-hydroxy-1.2-naphthophenazine-3'-carboxylic acid chloride and the isomeric 6'-carboxylic acid chloride are condensed with 29.2 parts of 6.7-dichloro-1-aminoanthrachinone in 200 parts of trichlorobenzene as described above. A yellowish brown vat dyestuff is thus obtained.

Example 6

10.3 parts of the mixture of the dibromo-8-hydroxy-1.2-naphthophenazine-4'-carboxylic acid chloride (see Example 3) and the isomeric 5'-carboxylic acid chloride are heated to about 150° C. with 2.4 parts of 1.4-diamino-anthraquinone in 100 parts of nitrobenzene until the reaction is complete. After cooling the dyestuff is filtered with suction, washed with alcohol and dried. The dyestuff thus obtained dyes from a current-colored vat orange shades.

Example 7

20.6 parts of the mixture of the dibromo-8-hydroxy-1.2-naphthophenazine-4'-carboxylic acid chloride (see Example 3) and the isomeric 5'-carboxylic acid chloride are heated to 150° C. with 4.8 parts of 1.5-diamino-anthraquinone in 100 parts of nitrobenzene until the reaction is complete. After cooling the dyestuff is filtered with suction, rinsed with alcohol and dried. The dyestuff thus obtained dyes from a brown vat orange shades.

We claim:

1. The products which are obtained by causing an 8-hydroxy-1.2-naphthophenazine-carboxylic acid halide to react with an amine being derived from anthraquinone, these compounds corresponding to the probable general formula

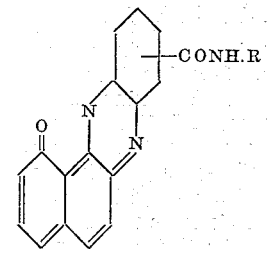

wherein R stands for an anthraquinone.

2. The product which is obtained by causing to react a mixture of the isomerics of the 8-hydroxy-1.2-naphthophenazine-4'-carboxylic acid chloride and the 8-hydroxy-1.2-naphthophenazine-5'-carboxylic acid chloride with 1-amino-anthraquinone, this product corresponding to the probable formula

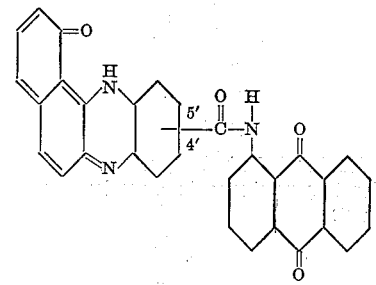

wherein the CO-group is attached to the phenazine nucleus partly in 4'- and partly in 5'-position thereof.

3. The product which is obtained by causing to react the mixture of the isomerics of the dibromo-8-hydroxy-1.2-naphthophenazine-4'-carboxylic acid chloride and the dibromo-8-hydroxy-1.2-naphthophenazine-5'-carboxylic acid chloride with 1-amino-4-benzoylamino-anthraquinone, this product corresponding to the probable formula

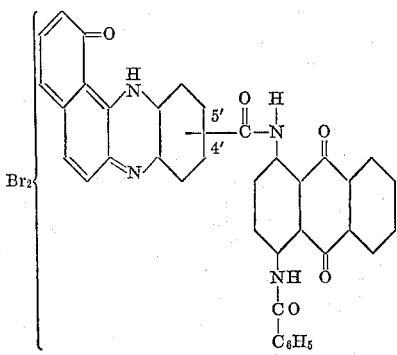

wherein the CO-group is attached to the phenazine nucleus partly in 4'- and partly in 5'-position thereof.

4. The product which is obtained by causing to react the mixture of the isomerics of the dibromo-8-hydroxy-1.2-naphthophenazine-4'- carboxylic acid chloride and the dibromo-8-hydroxy-1.2-naphthophenazine-5'-carboxylic acid chloride with 1-amino - 5 - benzoylamino - anthraquinone, this product corresponding to the probable formula

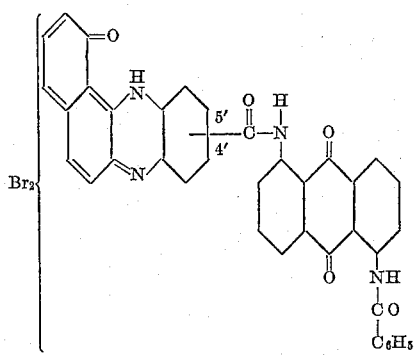

wherein the CO-group is attached to the phenazine nucleus partly in 4'- and partly in 5'-position thereof.

HANS HOYER.
OTTO BAYER.